Nov. 11, 1941.  A. NAGEL  2,262,553

PHOTOGRAPHIC APPARATUS OF THE MAGAZINE TYPE

Filed March 28, 1940  2 Sheets-Sheet 1

AUGUST NAGEL
INVENTOR

BY
ATTORNEYS

Nov. 11, 1941.    A. NAGEL    2,262,553
PHOTOGRAPHIC APPARATUS OF THE MAGAZINE TYPE
Filed March 28, 1940    2 Sheets-Sheet 2
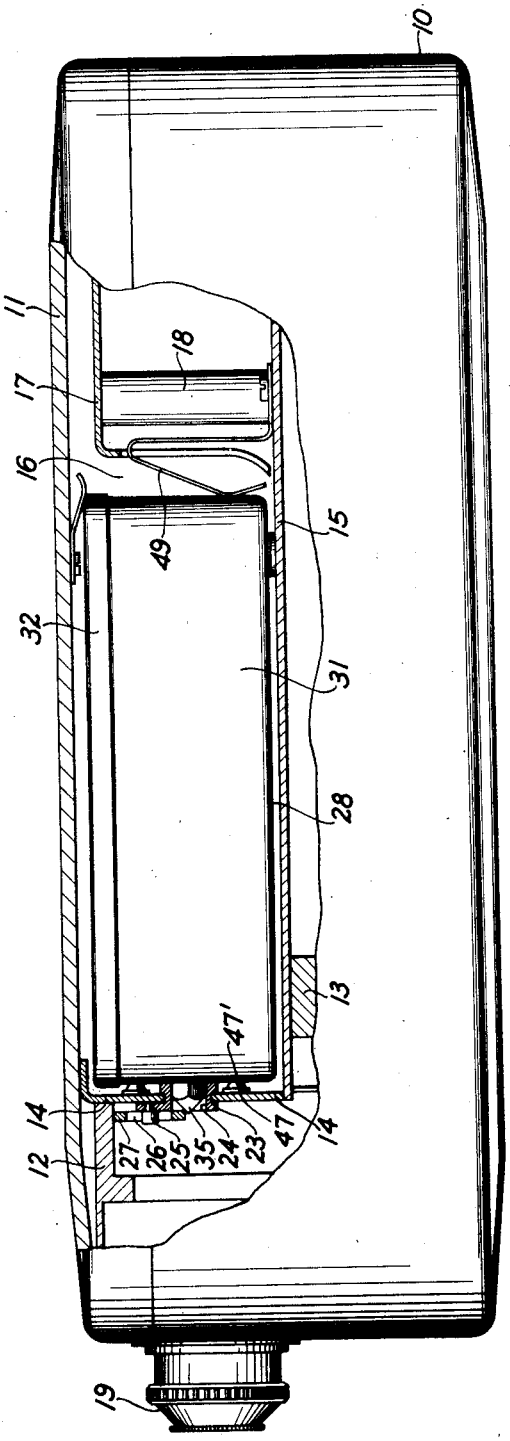
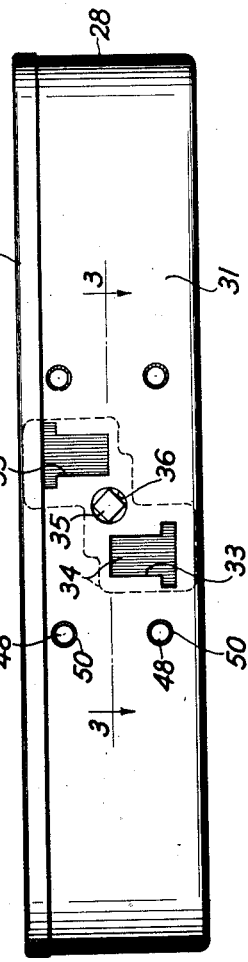
AUGUST NAGEL
INVENTOR
BY
ATTORNEYS Patented Nov. 11, 1941

2,262,553

UNITED STATES PATENT OFFICE 2,262,553

PHOTOGRAPHIC APPARATUS OF THE MAGAZINE TYPE

August Nagel, Stuttgart-Degerlock, Germany, assignor to Eastman Kodak Company, Rochester, N. Y., a corporation of New Jersey Application March 28, 1940, Serial No. 326,457
In Germany April 3, 1939

15 Claims. (Cl. 88—17)

The present invention relates to a photographic apparatus of the magazine type and more particularly to an arrangement for accurately locating the film in the magazine in the focal plane of the objective on the apparatus.

It is known that locating dowels may be provided on a film magazine for accurate location of the magazine within a camera and also that a floating gate may be provided on the film magazine and located by a camera part upon insertion of the film magazine into the magazine chamber of the apparatus.

The primary object of the present invention is the provision of a film magazine having a floating film gate carrying a plurality of protuberances in combination with a photographic apparatus having a plurality of projections with engaging surfaces in a common plane spaced a definite distance from the focal plane of the objective and for engaging the protuberances on the floating gate to locate the film in the magazine precisely in the focal plane of the objective.

Another object of the invention is the provision of symmetrically and rectangularly arranged projections on the front wall of a magazine chamber and for entering a film magazine to engage similarly arranged protuberances on a floating gate member so that the film in the magazine is accurately positioned in the focal plane of the apparatus objective.

A further object of the invention is the provision in a photographic apparatus of the reversible magazine type of a shutter operating member rotatable about an axis coinciding with the axis of magazine inversion and a plurality of projections on the front wall of the magazine chamber and symmetrically arranged with respect to said axis of the shutter operating member and for engaging similarly arranged protuberances on a floating gate member in the film magazine.

Other and further objects of the invention will be suggested to those skilled in the art by the disclosure which follows.

The above and other objects of the invention are embodied in a photographic apparatus of the magazine type and comprising in combination a casing providing a magazine chamber and including an apertured member forming one wall of said chamber, an objective member mounted on said casing and having its focal plane within the magazine chamber, a plurality of projections on the apertured wall of the magazine chamber and each having an engaging surface in a common plane which is spaced a definite distance from the focal plane of said objective member, a film magazine with a lateral wall which is provided with a plurality of holes each located to receive one of said projections when the magazine is inserted into said chamber, an apertured film gate member having a film guiding surface and resiliently urged toward the lateral wall of the magazine, and a plurality of protuberances on such floating gate member opposite the film guiding surface thereof and having engaging surfaces which are arranged to be engaged by said projections and which are located in a common plane spaced from said film guiding surface a distance equal to the definite spacing between the focal plane of said objective member and the common plane including the surfaces of said projections. In addition, said projections and protuberances may be symmetrically and/or rectangularly arranged with respect to the axis of magazine inversion so that the aforementioned co-operation between the projections on the magazine wall and the protuberances on the floating gate member in the film magazine will occur in either of the relatively inverted positions of the reversible magazine in the magazine chamber.

Reference is now made to the accompanying drawings wherein similar reference characters designate similar elements and wherein:

Fig. 4 is a bottom elevation of the magazine camera enclosing a film magazine according to the invention with a portion of the bottom wall of the camera casing broken away, and Fig. 5 is a front elevation of a film magazine according to the invention.

Figure 1:
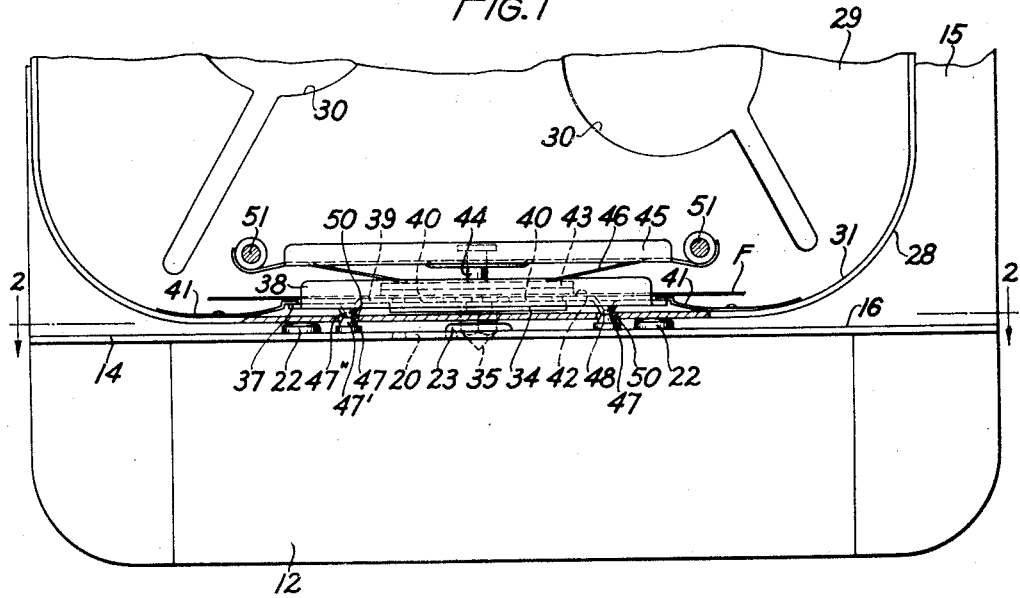
Fig. 1 is a partial side elevation of a magazine and camera according to the invention with the front lateral wall of the magazine broken away to show the co-operation between the projections on the magazine wall and the protuberances on the floating gate member in the magazine.

In the illustrated embodiment of the invention, see Fig. 4, the photographic apparatus or motion picture camera of the magazine type comprises a casing 10 closed by a cover 11. A frame member 12 and a frame member 13 within said casing 10 respectively support a wall 14 and a mechanism plate 15. A magazine chamber 16 is provided within casing 10, is enclosed by cover 11, has one side formed by the mechanism plate 15, has its front side formed by the wall 14 and has its rear side formed by the cover plate 17 which is supported from mechanism plate 15 by a post 18. An objective member 19 is mounted on the front wall of casing 10 and has its focal plane within said magazine chamber 16.

Figure 2:
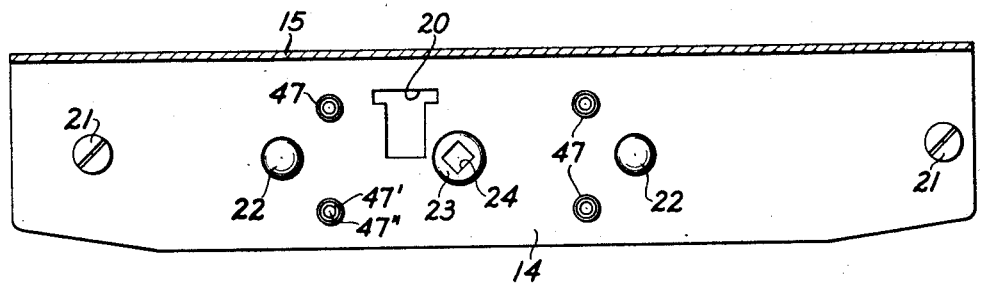
Fig. 2 is a transverse section through the apparatus taken on line 2—2 of Fig. 1 and showing an elevation of the apertured front wall of the magazine chamber.
Figure 3:
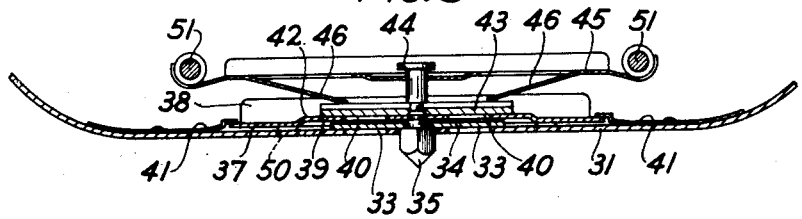
Fig. 3 is a fragmentary longitudinal section of the floating gate of the film magazine taken on the line 3—3 of Fig. 5.

The wall 14 is provided with a T-shaped aperture 20 which is in alignment with said objective member 19 and through which the image formed by said objective 19 passes. Said wall 14 is fastened to the frame member 12 by screws 21, see Fig. 2. A pair of locating studs 22 are fastened to apertured wall 14 for a purpose to be later described. A shutter operating member is mounted on wall 14 and may comprise a bushing 23 journaled in said apertured wall 14, provided with a square opening 24 and carrying a pin 25 within the slot 26 of an operating arm 27, see Fig. 4. The operating arm 27 may be actuated in any suitable manner such as by the latching means for the cover, not shown, or manually.

The film magazine 28 has a side wall 29 which is provided with embossings 30 and has a lateral wall 31. A cover 32 closes said film magazine 28 and film rolls arranged in any conventional manner but not shown herein. The front lateral wall 31 of film magazine 28 is apertured for alignment with the T-shaped aperture 20 in wall 14 and is povided with one or more T-shaped apertures 33. A shutter member 34 carries a square shutter pin 35 extending through an opening 36 in said lateral wall 31. A front gate member 37 has side flanges 38, and a central embossed portion 39 which is provided at least with one T-shaped aperture 40. A pair of spring clips 41 are riveted to front lateral wall 31 and overlap the ends of front gate member 37 resiliently to urge the same toward the front lateral wall 31 of the film magazine 28. The rear face of said embossed portion 39 constitutes a film-engaging surface 42 on said front gate member 37 and against which the film F is held by a pressure pad 43 fitting between the side flanges 38 of front gate member 37. A headed stud 44 extends rearwardly from pressure pad 43 and through an opening in a spring member 45 supported at its ends by posts 51 attached to side wall 29 of film magazine 28. A pair of spring tongues 46 are bent from spring member 45 to bear against the rear surface of pressure pad 43 and hold the film strip P with proper tension between said pressure pad 43 and the film engaging surface 42 of embossed portion 39 on front gate member 37.

The shutter member 34 has a contour such as to cover the T-shaped apertures 33 in the front lateral wall 31 and the T-shaped apertures 40 in embossed portion 39. Said shutter member 34 is journaled in embossed portion 39 and may be rotated by turning the square shutter pin 35 so that the T-shaped apertures 33 and 40 are uncovered. The embossed portion 39 provides room for the shutter member 34 between the front gate member 37 and the front lateral wall 31.

One outstanding difficulty in the manufacture of photographic apparatus of the magazine type is accurate location of the film within the film magazine precisely in the focal plane of the objective. This difficulty is substantially overcome by the provision in the film magazine of a floating gate member which is located by engagement with a camera part. However, it is extremely difficult to manufacture a plane surface on the camera and a plane surface on the floating gate member on the magazine so that surface contact will be obtained therebetween. This invention reduces such surface contact between the camera part and floating gate member to a minimum and at the same time improves the sealing of the film magazine against light and dust leakage into the interior of the magazine. Such a result is obtained by providing projections on the front wall of the magazine chamber in the apparatus and corresponding protuberances on the floating gate member in the film magazine.

Specifically, a plurality of projections 47 are mounted on the apertured wall 14 which forms the front side of the magazine chamber 16. These projections 47 are preferably symmetrically arranged with respect to the axis of rotation of the shutter operating member or bushing 23. In the case of a reversible type of film magazine, the projections 47 are preferably located rectangularly as well as symmetrically with respect to the axis of the shutter operating member and the axis of magazine inversion. It is also preferred to provide tapered ends 47' on projections 47, said tapered ends having engaging surfaces 47" which lie in a common plane spaced a definite or predetermined distance from the focal plane within the magazine chamber of the objective member 19.

The front gate member 37 has a plurality of protuberances 48 embossed therefrom and also having engaging surfaces 48' in a common plane which is parallel to the film engaging surface 42 of said front gate member 37, the common plane of engaging surfaces 48' being spaced from the plane of film engaging surface 42 a distance equal to the definite or predetermined spacing between the focal plane of the objective member 19 and the common plane including the engaging surfaces 47" of the projections 47.

Opposite each protuberance 48 the front lateral wall 31 of film magazine 28 is provided with holes 50 so that the engaging surfaces 48' of protuberances 48 are available from the exterior of the magazine. It will be noted that protuberances 48 are conically formed and substantially fill the holes 50 in lateral wall 31. In any event, the spring clips 41 urge front gate member 37 toward lateral wall 31 and press the protuberances 48 into holes 50 so that the holes 50 are effectively sealed against light or dust leakage into the magazine. This sealing effect is obviously enhanced by the conical formation of protuberances 48 so as to engage the edges of holes 50 when the film magazine 28 is not in the apparatus.

When the film magazine 28 is inserted into magazine chamber 16, see Fig. 4, the spring member 49, engages the rear edge of said magazine 28 and urges it toward the apertured wall 14. As a result, the projections 47 and particularly the tapered ends 47' and engaging surfaces 47" thereof enter the holes 50 in the magazine front lateral wall 31 to abut against the engaging surfaces 48' of protuberances 48. Since the common plane of engaging surfaces 47' is spaced from the focal plane of the objective a distance equal to the spacing between the common plane of engaging surfaces 48' of protuberances 48 and the film engaging surface 42 of embossed portion 39, the film F will be accurately and precisely located in the focal plane of said objective member 19. Since the spring clips 41 are somewhat lighter or weaker than the spring member 49, it is desirable to limit the action of said spring member 49 so that the floating gate member will not be excessively displaced and so that the tension on the film between gate members 37 and 43 will not be greatly altered. To this end, the locating studs 22 are positioned to abut the front lateral wall 31 of film magazine 28 and to overcome the strong resilient action of the spring member 49. In this way also the position of the magazine within the magazine chamber 16 will not vary appreciably so that no difficulties are encountered in centering the film driving members and the magazine.

Also during insertion of the magazine, the square shutter pin 35 will enter the square opening 24 in bushing 23. Rotation of the shutter operating member or operating arm 27, pin 25 and bushing 23 will rotate pin 35 to open the shutter member 34 with respect to the T-shaped apertures 33 and 40 of the film magazine. The protuberances 48 on front gate member 37 are arranged beyond the path of movement of the shutter member 34 so as not to interfere with operation of the magazine shutter. For a reversible type of magazine, the exposure apertures therein are preferably symmetrically arranged with respect to the axis of magazine inversion. In the present instance, the axis of magazine inversion for a reversible magazine coincides with the axis of rotation for the shutter member 34. Correspondingly, the protuberances 48 on the front gate member 37 for a reversible type of film magazine are also symmetrically arranged both with respect to the axis of inversion of the magazine and/or the axis of rotation of the shutter member. Likewise, the projections 47 on the apertured wall 14 are symmetrically arranged with respect to the axis of rotation of the shutter operating member including the bushing 23. Thus it will be evident that projections 47 and protuberances 48 or the engaging surfaces 47'' and 48' thereon co-operate in either of the relatively inverted positions of the magazine for accurate and precise location of the film in the magazine at the focal plane of the objective on the apparatus casing.

The foregoing disclosure is merely illustrative and the invention may be performed in other ways. Consequently, the scope of the invention is not to be determined by the illustrated embodiment disclosed herein but rather by the scope of the claims which follow.

Having now particularly described my invention what I desire to secure by Letters Patent of the United States and what I claim is:

1. In a photographic apparatus of the magazine type, the combination with a casing providing a magazine chamber and including an apertured member forming one wall of said chamber, an objective member mounted on said casing and having a focal plane within said magazine chamber, and a plurality of projections on said apertured member and each having a surface in a common plane spaced a definite distance from said focal plane, of a film magazine having a lateral wall which is provided with a plurality of holes each located to receive one of said projections, an apertured film gate member having a film guiding surface and resiliently urged toward the lateral wall of said magazine, and a plurality of engaging surfaces on said gate member, adapted to be engaged by said projections, and located in a common plane spaced from said film guiding surface a distance equal to the definite spacing between the focal plane of said objective member and the plane including the surfaces of said projections.

2. In a photographic apparatus of the magazine type, the combination with a casing providing a magazine chamber and including an apertured member forming one wall of said chamber, an objective member mounted on said casing and having a focal plane within said magazine chamber, and a plurality of projections on said apertured member and each having a surface in a common plane spaced a definite distance from said focal plane, of a film magazine having a lateral wall which is provided with a plurality of holes each located to receive one of said projections, an apertured film gate member having a film guiding surface and resiliently urged toward the lateral wall of said magazine, and a plurality of protuberances on said gate member opposite the film guiding surface thereof, and having engaging surfaces which are arranged to be engaged by said projections and which are located in a common plane spaced from said film guiding surface a distance equal to the definite spacing between the focal plane of said objective member and the plane including the surfaces of said projections.

3. In a photographic apparatus of the magazine type, the combination with a casing providing a magazine chamber and including an apertured wall forming the front of said chamber, a resilient means in said casing for urging a film magazine toward said apertured wall, and a plurality of projections thereon, of a film magazine having a lateral wall which is provided with a plurality of holes each located to receive one of said projections, an apertured film gate member having a plurality of protuberances arranged to be engaged by said projections, and a spring means for urging said film gate member toward the front wall of said magazine, and locating studs also on said apertured wall, being shorter than said projections, and for engaging the exterior of said magazine to limit the movement thereof by said resilient means.

4. In a photographic apparatus of the reversible magazine type, the combination with a casing providing a magazine chamber, an objective member mounted on said casing and having a focal plane within said magazine chamber, a wall in said casing provided with an aperture, forming the front of said magazine chamber, and having a plurality of engaging surfaces in a common plane spaced a definite distance from said focal plane, and a film magazine adapted to be inserted into said magazine chamber in either of two relatively inverted positions and having a front lateral wall provided with at least one opening for alignment with said aperture in said casing wall in either position of the magazine to expose through said objective member different portions of a film strip in said magazine and a plurality of holes in the front wall of the magazine, of an apertured film gate member movable within said magazine toward and away from said front lateral wall thereof and having a film guiding surface, a plurality of protuberances on said gate member opposite said film guiding surface and having engaging surfaces located in a common plane spaced from said guiding surface a distance equal to the definite spacing between the focal plane of said objective member and the plane of the engaging surfaces on the apertured casing wall, and a resilient means in said magazine for urging said gate member toward the front lateral wall thereof and for pressing said protuberances through the holes in the front wall of the magazine and against the engaging surfaces of the casing wall in either position of said film magazine within said chamber.

5. In a photographic apparatus of the reversible magazine type, the combination with a casing providing a magazine chamber, an objective member mounted on said casing and having a focal plane within said magazine chamber, a wall in said casing provided with an aperture and forming the front wall of said magazine chamber, a plurality of projections on said wall and having a plurality of engaging surfaces in a common plane spaced a definite distance from said focal plane, and a film magazine adapted to be inserted into said magazine chamber in either of two relatively inverted positions and having a front lateral wall provided with at least one opening for alignment with said aperture in said casing wall in either position of the magazine to expose through said objective member different portions of a film strip in said magazine, of an apertured film gate member within said magazine and having a film guiding surface, a plurality of protuberances on said gate member opposite said film guiding surface, and arranged to cooperate with said projections in either position of said film magazine, and having engaging surfaces located in a common plane spaced from said film guiding surface a distance equal to the definite spacing between the focal plane of said objective member and the plane of the engaging surfaces on said projections, and a resilient means in said magazine for urging said gate member toward the front lateral wall thereof and for pressing said protuberances against the engaging surfaces of said projections in either position of said film magazine within said chamber.

6. In a photographic apparatus of the reversible magazine type, the combination with a casing providing a magazine chamber and including a wall provided with an aperture and forming the front of said magazine chamber, and a film magazine adapted to be inserted into said magazine chamber in either of two relatively inverted positions with respect to an axis of inversion and having a front lateral wall apertured for alignment with said aperture in the casing wall in either position of the magazine in said chamber, of an apertured film gate member within said magazine and having a film guiding surface, a plurality of protuberances on said gate member opposite said film guiding surface, symmetrically arranged with respect to the axis of inversion of the magazine, and extending into openings in the front lateral wall thereof, a plurality of projections on the apertured wall of said casing and located each to co-operate with one of the protuberances on said gate member in either position of said magazine, and a resilient means in said magazine for urging said gate member toward the front lateral wall thereof and for pressing said protuberances against said projections in either position of said film magazine within said chamber.

7. In a photographic apparatus of the reversible magazine type, the combination with a casing providing a magazine chamber and including a wall provided with an aperture and forming the front of said magazine chamber, and a film magazine adapted to be inserted into said magazine chamber in either of two relatively inverted positions with respect to an axis of inversion and having a front lateral wall apertured for alignment with said aperture in the casing wall in either position of the magazine in said chamber, of an apertured film gate member within said magazine and having a film guiding surface, four protuberances on said gate member opposite said film guiding surface, symmetrically and rectangularly arranged with respect to the axis of inversion of the magazine, and extending into openings in the front lateral wall thereof, four projections on the apertured wall of said casing and located each to cooperate with one of the protuberances on said gate member in either position of said magazine, and a resilient means in said magazine for urging said gate member toward the front lateral wall thereof and for pressing said protuberances against said projections in either position of said film magazine within said chamber.

8. In a photographic apparatus of the reversible magazine type, the combination with a casing providing a magazine chamber and including a wall provided with an aperture and forming the front of said magazine chamber, a film magazine adapted to be inserted into said magazine chamber in either of two positions relatively inverted with respect to an axis of inversion and having a front lateral wall provided with at least one opening for alignment with said apertures in the casing wall in either position of the magazine in said chamber, a shutter member on said magazine for covering and uncovering the openings in said front lateral wall and including an operating pin extending from the magazine along the axis of inversion thereof, and a shutter operating member on the casing wall, rotatable about an axis coinciding with said axis of magazine inversion, and for engaging the operating pin of the magazine shutter member in either position of said magazine, of an apertured film gate member within said magazine and resiliently urged toward the front lateral wall thereof, a plurality of protuberances on said gate member, symmetrically arranged with respect to the operating pin of said shutter member, and extending into openings in the front lateral wall of said magazine, and a plurality of projections on the apertured wall of said casing, symmetrically arranged with respect to the axis of rotation of said shutter operating member, and located each to co-operate with one of the protuberances on said gate member in either position of said magazine in said chamber.

9. A photographic apparatus of the reversible magazine type, comprising a casing providing a magazine chamber through which extends an axis of inversion for a reversible film magazine having spaced holes therein, an objective member mounted on said casing and having a focal plane within said magazine chamber, a wall in said casing provided with an aperture and forming the front of said magazine chamber, and a plurality of projections extending from said wall into said magazine chamber and symmetrically located with respect to the axis of inversion therethrough, each of said projections having an engaging surface and all of said engaging surfaces being in a common plane spaced a definite distance from and parallel to the focal plane of said objective member and being adapted to extend through the holes of the film magazine.

10. A photographic apparatus of the reversible magazine type, comprising a casing providing a magazine chamber through which extends an axis of inversion for a reversible film magazine having four holes therein, an objective member mounted on said casing and having a focal plane within said magazine chamber, a wall in said casing provided with an exposure aperture and forming the front of said magazine chamber, and four projections on said wall rectangularly arranged, symmetrically located with respect to the axis of magazine inversion, and each having an engaging surface in said magazine chamber, all of said engaging surfaces being in a common plane spaced a definite distance from and parallel to the focal plane of said objective member and being adapted to extend through the four holes in the magazine.

11. A photographic apparatus of the reversible magazine type, comprising a casing providing a magazine chamber through which extends an axis of inversion for a reversible film magazine, an objective member mounted on said casing and having a focal plane within said magazine chamber, a wall in said casing provided with an aperture and forming the front of said magazine chamber, a magazine shutter operating member on said wall and rotatable about an axis coinciding with said axis of magazine inversion, and a plurality of projections on said casing wall symmetrically arranged with respect to the axis of rotation of said shutter operating member, and each having an engaging surface, all of said engaging surfaces being in a common plane spaced a definite distance from the focal plane of said objective member.

12. In a film magazine, the combination with a container having a front lateral wall provided with an exposure aperture and a plurality of holes, a film gate member within said container and also provided with an exposure aperture, a plurality of protuberances on said gate member located and arranged to enter and at least partially fill said holes in the front lateral wall of said container, and a resilient means acting on said gate member and for urging the same toward front lateral wall and urging said protuberances into the holes in said front lateral wall.

13. In a film magazine, the combination with a container having a front lateral wall provided with an exposure aperture, a film gate member movable within said container toward and away from said lateral wall thereof and also provided with an exposure aperture, a shutter member between said front lateral wall and said gate member and movable to cover and uncover the exposure apertures therein, a plurality of protuberances on said gate member beyond the path of movement of said shutter member, a plurality of holes in the magazine, said protuberances on the gate member entering and at least partially filling the corresponding holes in said front lateral wall of the container, and resilient means within said container engaging and urging said gate member toward said front lateral wall and also urging said protuberances on the movable gate member into said holes in said lateral wall.

14. In a film magazine, the combination with a container having a front lateral wall provided with an exposure aperture, a film gate member movable within said container toward and away from said lateral wall thereof and also provided with an exposure aperture, a resilient means engaging said gate member and normally urging the same toward said front lateral wall, a shutter member rotatably mounted between said front lateral wall and said gate member, movable to cover or uncover said exposure apertures therein, and having an operating pin extending through said front lateral wall, and a plurality of protuberances on said gate member, a plurality of holes in the magazine, said protuberances in the gate member being symmetrically arranged with respect to said operating pin, located beyond the path of movement of said shutter member, and urged by said resilient means into the corresponding holes in said front lateral wall of the container.

15. In a reversible film magazine, the combination with a container having a front lateral wall, a film gate member movable within said container toward and away from said lateral wall thereof, a shutter member mounted between said front lateral wall and said gate member and rotatable about an axis, said front lateral wall and said film gate member each being provided with a pair of exposure apertures symmetrically arranged with respect to the axis of said shutter member and which is movable to closed and opened positions with respect to said apertures, four protuberances on said gate member, four holes to receive said protuberances in the front magazine wall, said protuberances being rectangularly arranged and located symmetrically with respect to the shutter axis beyond the path of said shutter member, and for entering the corresponding holes in said front lateral wall of the container, and resilient means within said container engaging and urging said gate member toward said front lateral wall and also urging said protuberances on the movable gate member into said holes in the front lateral wall.

AUGUST NAGEL.

Disclaimer 2,262,553.—*August Nagel*, Stuttgart-Degerlock, Germany. PHOTOGRAPHIC APPARATUS OF THE MAGAZINE TYPE. Patent dated Nov. 11, 1941. Disclaimer filed Feb. 24, 1949, by the assignee, *Eastman Kodak Company*.

Hereby enters this disclaimer to claims 1 to 11, inclusive of said patent.

[*Official Gazette March 29, 1949.*]